United States Patent
Kim

(10) Patent No.: US 6,536,299 B2
(45) Date of Patent: Mar. 25, 2003

(54) SHIFT SWITCH-ACTUATING MECHANISM FOR DUAL MODE SHIFT LEVER UNIT

(75) Inventor: Hyung-Suk Kim, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/737,354

(22) Filed: Dec. 14, 2000

(65) Prior Publication Data

US 2001/0004850 A1 Jun. 28, 2001

(30) Foreign Application Priority Data

Dec. 28, 1999 (KR) ........................................ 1999-63652

(51) Int. Cl.⁷ ............................ B60K 20/00; G05G 9/00
(52) U.S. Cl. ............................... 74/473.18; 200/61.88; 200/537; 267/150
(58) Field of Search ................... 74/473.18; 200/61.88, 200/557; 267/150

(56) References Cited

U.S. PATENT DOCUMENTS

| | | | |
|---|---|---|---|
| 5,044,220 A | * 9/1991 | Raff et al. | 74/335 |
| 5,070,740 A | * 12/1991 | Giek et al. | 200/61.88 |
| 5,150,633 A | * 9/1992 | Hillgartner | 74/473.18 |
| 5,791,197 A | * 8/1998 | Rempinski et al. | 74/473.18 |
| 6,192,770 B1 | * 2/2001 | Miyoshi et al. | 74/473.15 |

* cited by examiner

Primary Examiner—David Fenstermacher
(74) Attorney, Agent, or Firm—Christie, Parker & Hale, LLP

(57) ABSTRACT

A shift switch-actuating mechanism for a dual mode shift lever unit is provided, including a shift lever pivotally connected to a pivot shaft supported by a lever housing and a cable block pivotally mounted on the pivot shaft outside the lever housing, the lever housing having an opening on its wall facing the cable block such that the shift lever and the cable block interact with each other, wherein the shift switch-actuating mechanism is mounted on an upper wall of the shift lever housing below an indicator panel so as to be operated in a manual mode and includes a base plate having an indented portion for receiving the shift lever, an up shift switch mounted on the base plate for detecting up shift manipulations of the shift lever, a down shift switch oppositely mounted on the base plate for detecting down shift manipulations of the shift lever, a manual mode switch mounted inside the indented portion of the base plate for detecting manual mode conversion of the shift lever, and a switch actuator for mounted on the base plate between the up and down shift switches for selectively operating the up and down shift switches, the up and down shift switches being oppositely arranged so as to cross over the indented portion of the base plate, and one end of the switch actuator is projected into the indented portion.

7 Claims, 4 Drawing Sheets

SHIFT SWITCH-ACTUATING MECHANISM FOR DUAL MODE SHIFT LEVER UNIT

CROSS-REFERENCE TO RELATED APPLICATION

This application claims priority of Korea patent Application No. 99-63652, filed on Dec. 28, 1999.

BACKGROUND OF THE INVENTION (a) Field of the Invention

The present invention relates to a dual mode shift lever unit for an automatic transmission, and in particular, to a shift switch-actuating mechanism for a dual mode shift lever unit having automatic and manual modes, which is capable of providing reliable shifts in manual mode and is simplified by having a reduced number of parts.

(b) Description of the Related Art

Recently, high-class automobiles have tended to be equipped with a dual mode transmission mechanism for satisfying driver whimsical tastes to sometimes manually shift the transmission like a sports car, and sometimes to enjoy ride quality of an automatic operation of a high-class sedan.

This kind of dual mode shift lever unit provides two shift modes, i.e., an automatic mode and a manual mode, such that an indicator panel is formed having a guide groove separating respective mode portions, as shown in FIG. 1.

The dual mode shift lever unit comprises a shift lever slidably inserted into the guide groove formed on the indicator panel and a cable block connected to a transmission manual valve by a cable.

Normally, when the shift lever unit is in the automatic mode, the shift lever is fixedly connected to the cable block such that the transmission manual valve is responsively operated by shift lever manipulation.

On the other hand, when the shift lever unit is in the manual mode, the shift lever is separated from the cable block such that the shift lever freely moves.

Also, the dual mode shift lever unit has a shift switch-actuating mechanism mounted on the upper wall of a lever housing below the indicator panel so as to be operated in the manual mode. FIG. 5 is a conventional shift switch-actuating mechanism of the dual mode shift lever unit.

In the manual mode, the shift lever is located between reaction means 104 and 105 which respectively include a cylinder 106, a piston rod 108, and a coil spring 107 biasing the piston rod in the cylinder 106 such that the shift lever is returned to the neutral position after up or down shift manipulation. The piston rod 108 is provided with a switch depressor formed at a distal end of the piston rod 108 for actuating a corresponding switch.

Along the lever's movement line, up and down shift switches 101 and 102 are mounted and a manual mode switch 103 is arranged therebetween such that whenever the shift lever 2 is manipulated for an up or down shift, the shift lever 2 causes a corresponding switch to be on. Accordingly, a TCU (transmission control unit), now shown, responsively controls the transmission on the basis of electrical signals from the switches 101, 102, and 103.

In this shift switch-actuating mechanism, however, it is difficult to maintain a distance between the switches and the switch depressors, and since the switch depressors move in vertical directions relative to the switches' working directions, the switching operation is unreliable.

Furthermore, it is difficult to manufacture the small reaction means, and the manufacturing is expensive.

SUMMARY OF THE INVENTION

The present invention has been made in an effort to solve the above problems of the prior art.

It is an object of the present invention to provide a shift switch-actuating mechanism for a dual mode shift lever unit which is capable of providing reliable shifts in manual mode and being simplified by reducing the number of parts, resulting in low manufacturing costs.

To achieve the above object, a shift switch-actuating mechanism for a dual mode shift lever unit is provided, including a shift lever pivotally connected to a pivot shaft supported by a lever housing and a cable block pivotally mounted on the pivot shaft outside the lever housing, the lever housing having an opening on its wall facing the cable block such that the shift lever and the cable block interact with each other. The the shift switch-actuating mechanism is mounted on an upper wall of the shift lever housing below an indicator panel so as to be operated in a manual mode, and it comprises a base plate having an indented portion for receiving the shift lever, an up shift switch mounted on the base plate for detecting up shift manipulations of the shift lever, a down shift switch oppositely mounted on the base plate for detecting down shift manipulations of the shift lever, a manual mode switch mounted inside the indented portion of the base plate for detecting manual mode conversion of the shift lever, and a switch actuator mounted on the base plate between the up and down shift switches for selectively operating the up and down shift switches, the up and down shift switches being oppositely arranged so as to cross over the indented portion of the base plate, and one end of the switch actuator is projected into the indented portion.

BRIEF DESCRIPTION OF THE DRAWINGS

The accompanying drawings, which are incorporated in and constitute a part of the specification, illustrate an embodiment of the invention, and together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
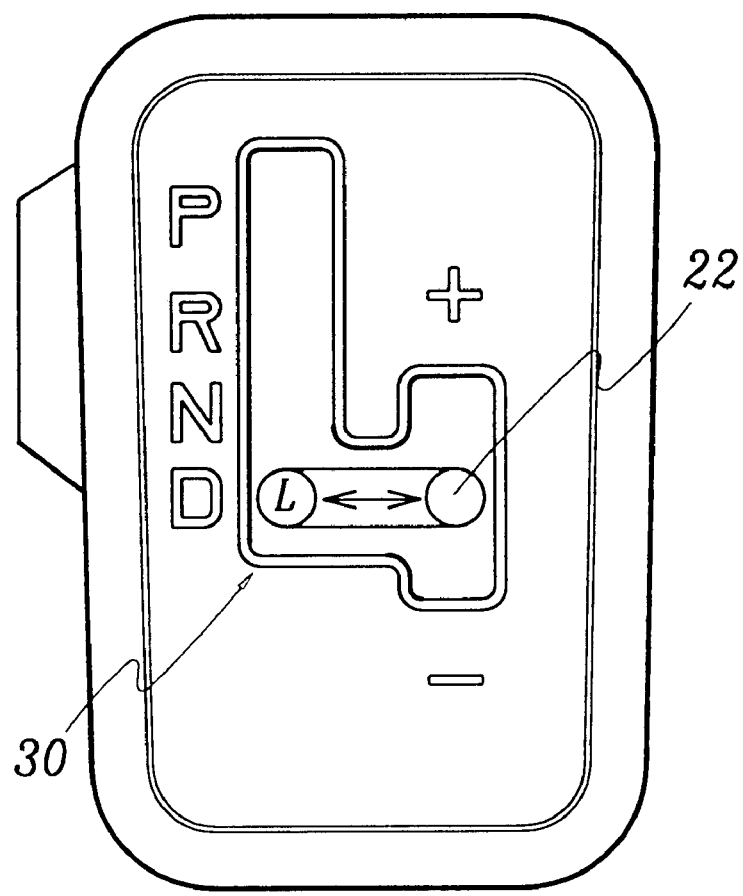
FIG. 1 is a schematic diagram of an indicator panel of a presently used dual mode shift lever unit.
Figure 2:
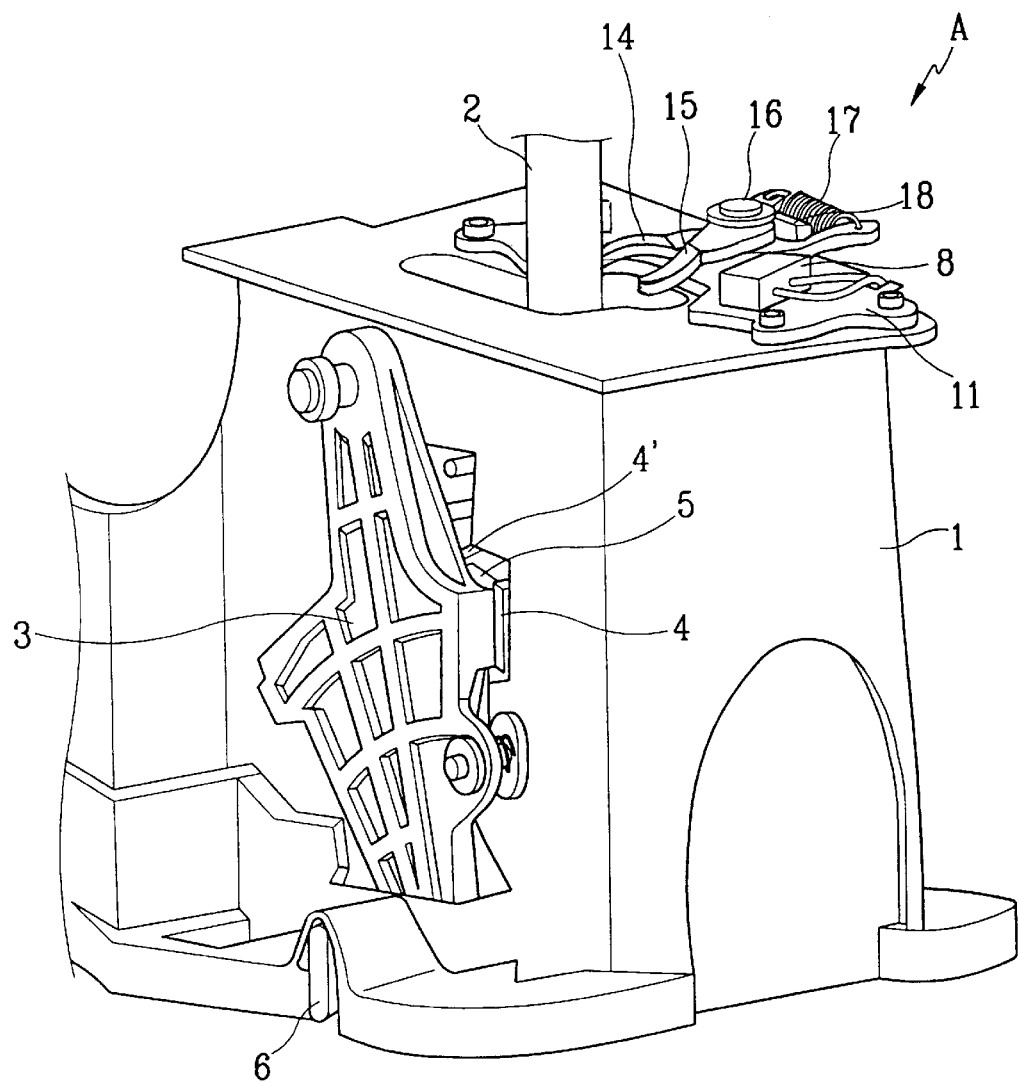
FIG. 2 is a perspective view of a dual mode shift lever unit having a shift switch-actuating mechanism according to a preferred embodiment of the present invention.

In FIG. 2, the dual mode shift lever unit comprises a shift lever 2 pivotally connected to a pivot shaft (not shown) in a lever housing 1 and a cable block 3 pivotally mounted on the pivot shaft outside the lever housing 1. The lever housing 1 is provided with an opening on its wall facing the cable block 5 such that the shift lever 2 and the cable block 3 interact with each other. Also, the dual mode shift lever unit has a shift switch-actuating mechanism mounted on the upper wall of the lever housing 1 below the indicator panel so as to be operated in the manual mode.

The shift lever 2 is provided with a pair of arms 4 and 4' formed on one side thereof facing the cable block 5.

The cable block 3 is provided with a projection 5 corresponding to the arms 4 and 4' and connected to a manual valve (not shown) of an automatic transmission (not shown) via a cable at its upper end so as to operate the manual valve by shift lever manipulation in the automatic mode in which the shift lever 2 is locked to the cable block 3 by receiving the projection 5 of the cable block 3 between a pair of arms 4 and 4' formed on shift lever 2.

Figure 3:
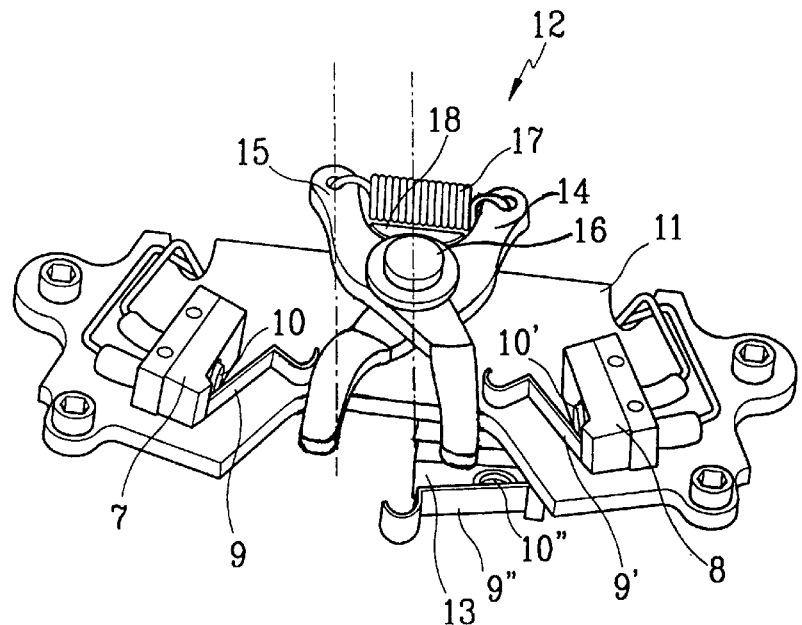
FIG. 3 is a perspective view of the shift switch-actuating mechanism of the dual mode shift lever unit of FIG. 2.

As shown in FIG. 3, the shift switch-actuating mechanism comprises an up shift switch 7 and a down shift switch B oppositely mounted on a base plate 11 on either side of a cut-out portion 21 of the base plate for receiving the shift lever, a switch actuator 12 mounted on the base plate 11 between the up and down switches 7 and 8, and a manual mode switch 13 mounted under the base plate 11.

The switch actuator 12 has an up switch lever 14 and down switch lever 15 which cross like scissors so as to pivot on a pin 16 fixed at a center of the base plate 11 and they are connected with a return spring 17 at one end of each, and a minimum distance between the ends of the levers 14 and 15 is limited by a stopper 18 formed between the levers 14 and 15. Free end portions of the up and down switch levers 14 and 15 are arranged at a parallel height, i.e., at the same height, by bending the free end portion of the up switch lever 14 at line 23 as shown schematically in FIGS. 2 and 3.

Each of the up and down shift switches 7 and 8 is provided with a button 10 and a contact plate 9 such that if the contact plate is depressed so as to contact the button 10, an electric signal is generated.

The manual mode switch 13 has the same structure as the up and down shift switches 7 and 8 except that its operating direction is vertical to the shift switches 7 and 8.

Figure 4:
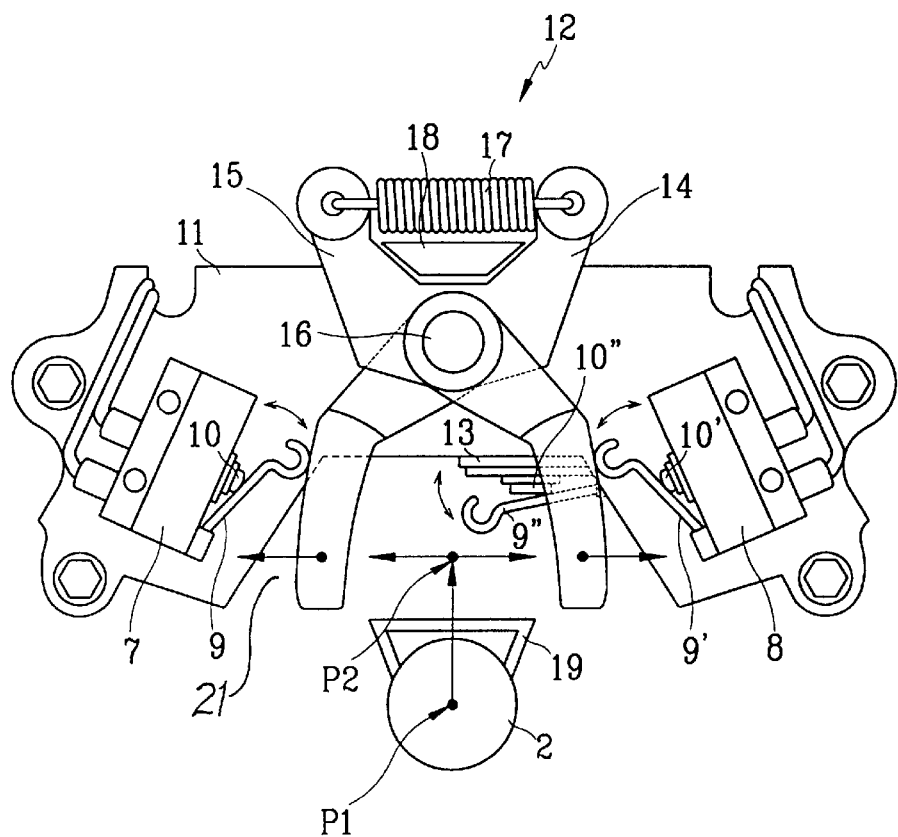
FIG. 4 is an operational view showing behavior of the shift switch-actuating mechanism of the dual mode shift lever unit of FIG. 2.
Figure 5:
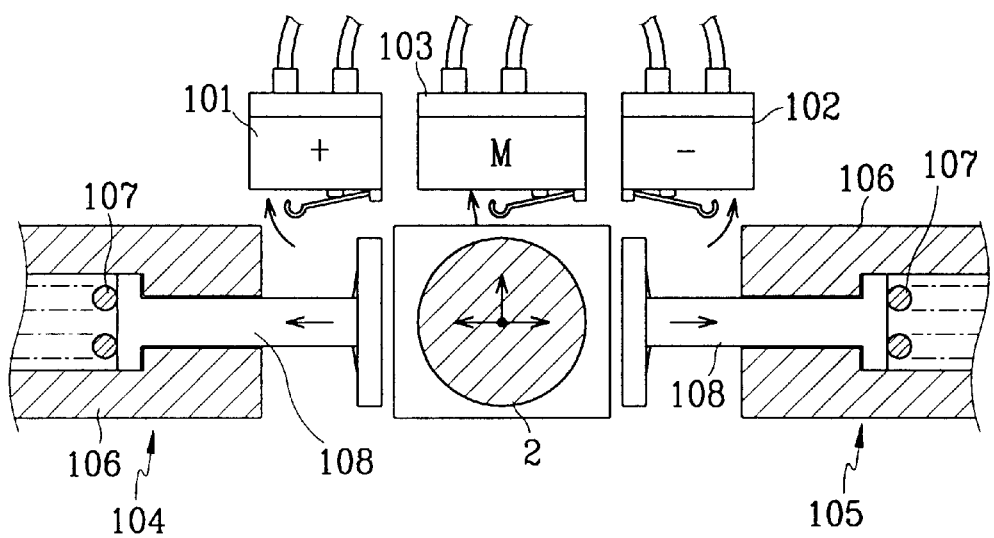
FIG. 5 is an operational view showing behavior of a conventional shift switch actuating mechanism.

The operation of the shift switch-actuating mechanism of the dual mode shift lever unit according to the preferred embodiment of the present invention will be described hereinafter with reference to FIG. 4.

If the shift mode is converted from the initial automatic mode to the manual mode, the shift lever 2 moves from a point P1 at a drive range position to a point P2 so as to be located between the up and down switch levers 14 and 15. During this mode conversion, the shift lever 2 depresses the contact plate 9" of the manual mode switch 13 so as to cause the contact plate 9" to contact the button 10" of the manual mode switch 13. Accordingly, the TCU determines this is the manual mode on the basis of the signal from the manual mode switch 13. In this manual mode position P2, the shift lever 2 can move in the up and down shift directions so that the shift lever 2 pushes the free end portion of the up switch lever 14 if the shift lever 2 is manipulated in the up shift direction and pushes the free end of the down switch lever 15 if the shift lever 2 is manipulated in the down shift direction. After the shift lever manipulation, the up and down switch levers 14 and 15 are returned to their normal positions by the elastic force of the return spring 17 and the stopper 18 limits the switch levers' movement. Accordingly, the shift lever can maintain its position at point P2 in the manual mode.

Whenever, the shift lever 2 is manipulated for the up and down shifts, the up and down switch levers 14 and 15 push the contact plate 9 and 9' of the corresponding shift switchs so as to cause the contact plate 9 and 9' to contact the button 10 and 10' such that the TCU controls the transmission on the basis of the signals from the up and down shift switches 7 and 8.

As described above, in the shift switch-actuating mechanism of the present invention, the switch levers are directly operated in the same direction of the shift lever manipulation direction such that switch can reliably detect the driver's intention.

Also, since the structure of the shift switch-actuating mechanism is simplified by reducing parts such as the complicated reaction means of the conventional actuating mechanism, the whole manufacturing costs decreases.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A shift switch-actuating mechanism for a dual mode shift lever unit including a shift lever pivotally connected to a pivot shaft supported by a lever housing and a cable block pivotally mounted on the pivot shaft outside the lever housing, the lever housing having an opening on its wall facing the cable block such that the shift lever and the cable block interact with each other, the shift switch-actuating mechanism being operated in a manual mode, and comprising:

a base plate having a cut-out portion for receiving the shift lever;

an up shift switch mounted on the base plate for detecting up shift manipulations of the shift lever;

a down shift switch oppositely mounted on the base plate for detecting down shift manipulations of the shift lever;

a manual mode switch mounted inside the cut-out portion of the base plate for detecting manual mode conversion of the shift lever; and a switch actuator pivotally mounted on the base plate between the up and down shift switches for selectively operating the up and down shift switches, the switch actuator comprising, a first switch lever that is pivoted by manipulation of the shift lever, a second switch lever, wherein one of said first and second switch levers is an up switch lever and wherein the other of said first and second switch levers is a down switch lever, wherein the up and down switch levers cross like scissors and pivot on a pin fixed at a center of the base plate, a return spring which interconnects ends of the up and down switch levers for returning the first and second switch levers after a shift operation, and a stopper formed on the base plate between the up and down switch levers for limiting the switch levers' movements, wherein the up and down shift switches are oppositely arranged, and one end of the switch actuator is projected into the cut-out portion.

2. A shift switch-actuating mechanism of claim 1 wherein free end portions of the up and down switch levers are projected into the cut-out portion of the base plate between the up and down shift switches such that the shift lever is interposed between the up and down switch levers in manual mode.

3. A shift switch-actuating mechanism of claim 2 wherein the free end portions of the up and down switch levers are arranged at a parallel height by bending one of the free end portions of the switch levers.

4. A shift switch-actuating mechanism for a dual mode shift lever unit including a shift lever pivotally connected to a pivot shaft supported by a lever housing and a cable block pivotally mounted on the pivot shaft outside the lever housing, the lever housing having an opening on its wall facing the cable block such that the shift lever and the cable block interact with each other, the shift switch-actuating mechanism being operated in a manual mode, and comprising:
- a base plate having a cut-out portion for receiving the shift lever;
- an up shift switch mounted on the base plate for detecting up shift manipulations of the shift lever;
- a down shift switch oppositely mounted on the base plate for detecting down shift manipulations of the shift lever;
- a manual mode switch mounted inside the cut-out portion of the base plate for detecting manual mode conversion of the shift lever; and
- a switch actuator mounted on the base plate between the up and down shift switches for selectively operating the up and down shift switches, the switch actuator comprising,
    - up and down switch levers which cross like scissors so as to pivot on a pin fixed at a center of the base plate,
    - a return spring which interconnects ends of the up and down switch levers for returning the up and down switch levers after a shift operation, and
    - a stopper formed on the base plate between the up and down switch levers for limiting the switch levers' movements.

5. A shift switch-actuating mechanism of claim 4 wherein free end portions of the up and down switch levers are projected into the cut-out portion of the base plate between the up and down shift switches such that the shift lever is interposed between the up and down switch levers in manual mode.

6. A shift switch-actuating mechanism of claim 5 wherein the free end portions of the up and down switch levers are arranged at a parallel height by bending one of the free end portions of the switch levers.

7. A shift switch-actuating mechanism of claim 4 wherein the up and down shift switches are oppositely arranged and one end of the switch actuator is projected into the cut-out portion.

* * * * *